No. 660,830. Patented Oct. 30, 1900.
L. A. ASPINWALL.
POTATO DIGGER.
(Application filed Apr. 2, 1900.)
(No Model.) 3 Sheets—Sheet 2.
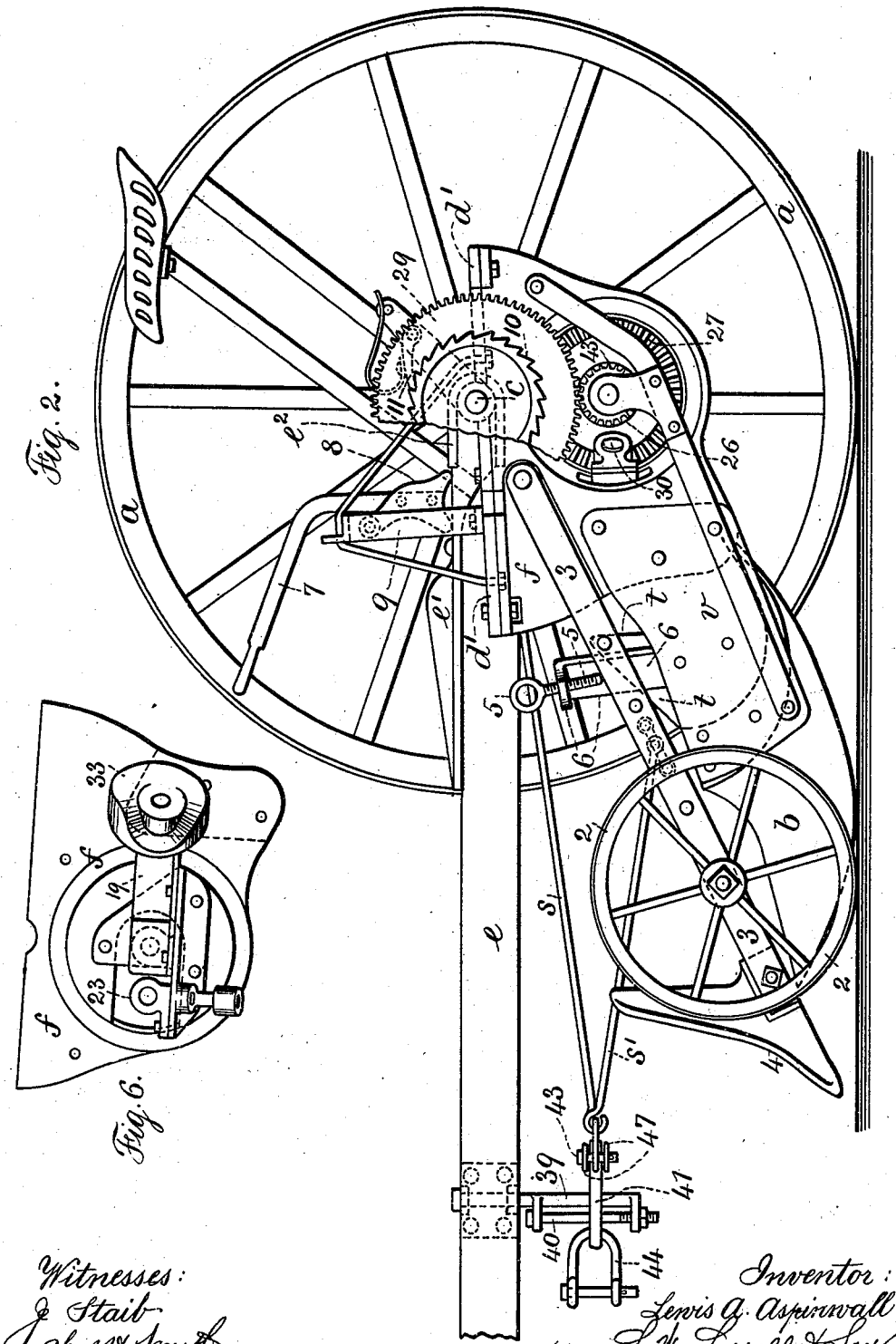

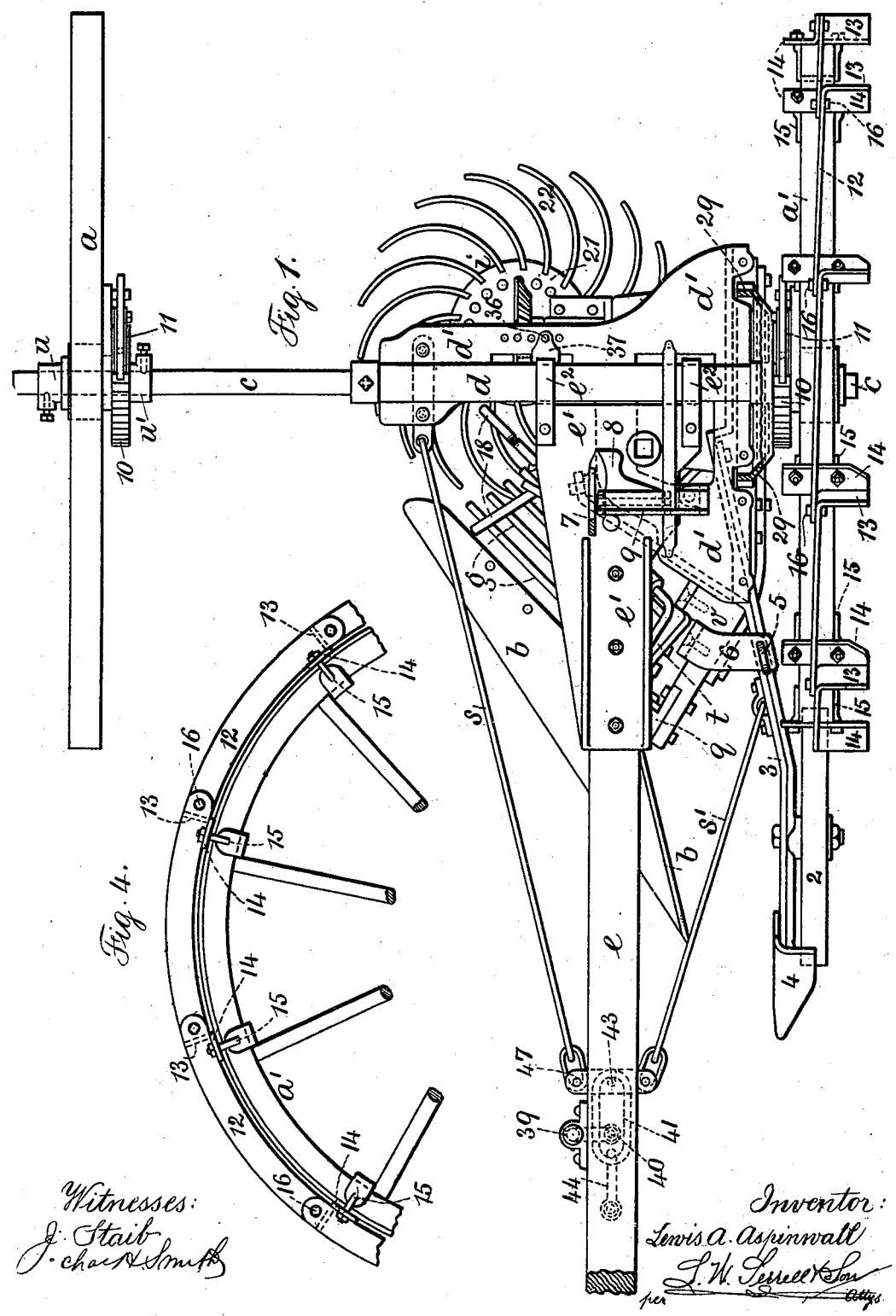

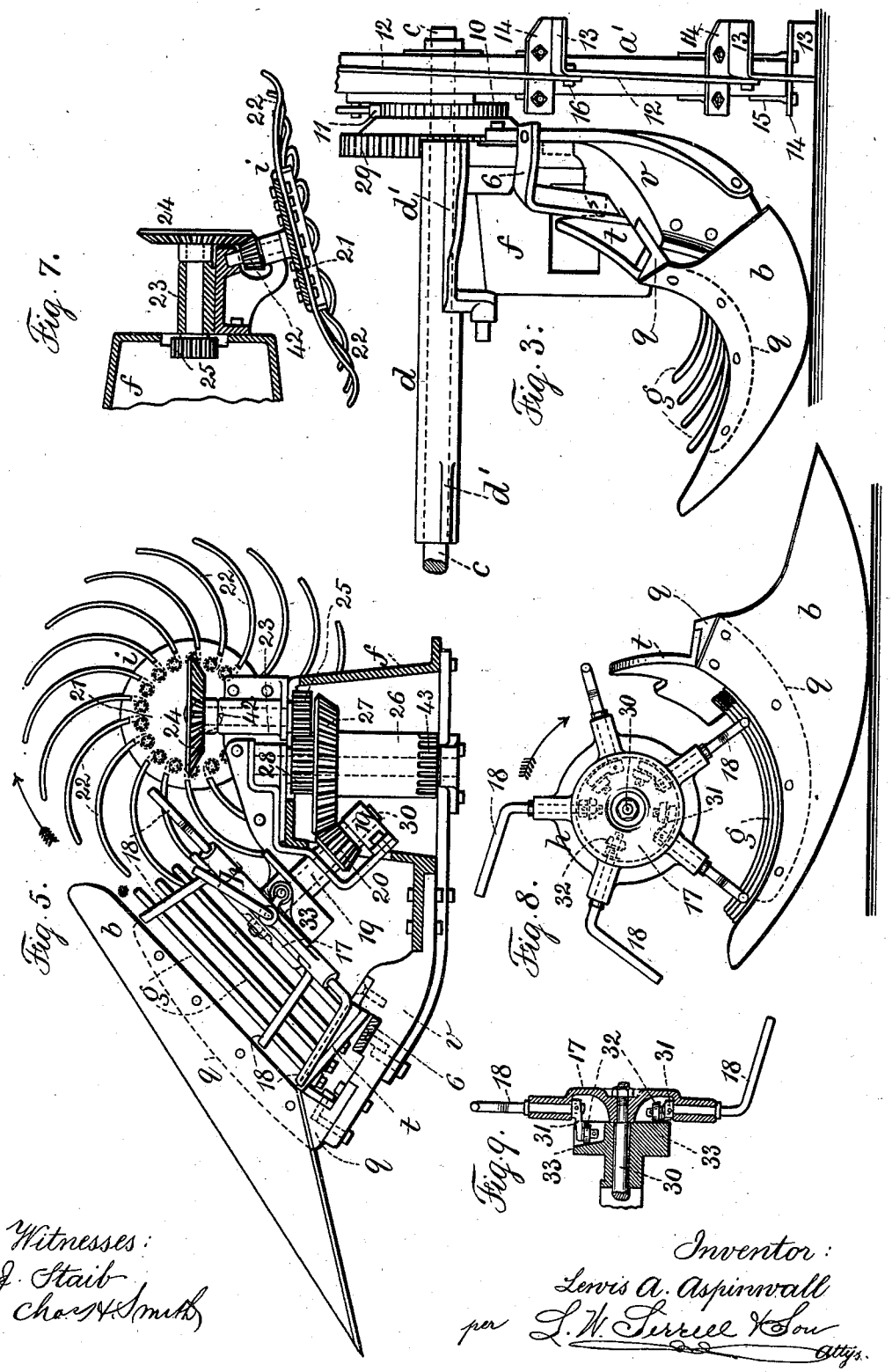

UNITED STATES PATENT OFFICE.

LEWIS AUGS. ASPINWALL, OF JACKSON, MICHIGAN, ASSIGNOR TO THE ASPINWALL MANUFACTURING COMPANY, OF SAME PLACE.

POTATO-DIGGER.

SPECIFICATION forming part of Letters Patent No. 660,830, dated October 30, 1900.

Application filed April 2, 1900. Serial No. 11,038. (No model.)

*To all whom it may concern:*

Be it known that I, LEWIS AUGUSTUS ASPINWALL, a citizen of the United States, residing at Jackson, in the county of Jackson and State of Michigan, have invented an Improvement in Potato-Diggers, of which the following is a specification.

My present invention relates to improvements upon the devices shown in the following Letters Patent heretofore granted to me: No. 189,911, dated April 24, 1877; No. 224,123, dated February 3, 1880; No. 264,603, dated September 19, 1882; No. 372,351, dated November 1, 1887, and No. 387,278, dated August 7, 1888.

The object of the present improvement is in part to simplify and in part to make more efficient the devices of the aforesaid patents and to overcome the difficulties connected with said devices.

In carrying out the present invention I employ a series of segmental wheel-flanges and devices for attaching the same to one of the driving-wheels, which wheel is made smaller than the other driving-wheel, so that with the flanges the diameter is approximately the same. By this device I prevent a sidewise sliding and swinging movement of the digger and also a slipping of the wheels when at work.

The plow in the present invention is concave, with a drawing edge extending rearward, forming a line of clearance, so as to cut into the soil, requiring less power and producing less strain on the mechanism.

In the present invention I make use of curved bars forming a grating adjacent to and rearward of the delivery edge of the plow, and I employ a pulverizing-wheel having bent angular swinging fingers for pulverizing the ground and producing conditions therein similar to digging the rows over a second time. This pulverizing-wheel separates the tops and weeds from the body of earth containing the potatoes. Adjacent to the pulverizing-wheel I place a horizontal finger-wheel or spreader, the special office of which is to sift the earth moved off from the grating by the pulverizing-wheel, so as to separate the potatoes from the loosened soil and free the potatoes and to cast or fling the same bodily to one side of the machine upon the surface of the ground for removal thereafter by hand, and I also make use of other and minor features of improvement that contribute to the success of the present device, and which are hereinafter more particularly described.

In the drawings, Figure 1 is a plan view representing my improvement, in which the seat and its supporting-bar are removed and a hand-lever shown in section. Fig. 2 is a side elevation with the left-hand wheel removed from the axle, so as to show the other parts more clearly. Fig. 3 is a partial elevation from the front of the machine with the pole and unnecessary parts removed, so as to show the plow and the adjacent frame and parts with as great clearness as possible. Fig. 4 is an elevation of part of the wheel carrying the segmental flanges. Fig. 5 is a sectional plan showing the plow, the pulverizing-wheel, the horizontal finger-wheel, and the means for operating the same. Fig. 6 is an elevation of part of the frame, showing the bearings for the pulverizing and horizontal finger-wheels and the cam for operating the fingers of the pulverizing-wheel. Fig. 7 is a section through the horizontal finger-wheel and frame and elevation of the means for operating the same. Fig. 8 is an elevation of the plow, grating, and pulverizing-wheel; and Fig. 9 is a vertical section through the pulverizing-wheel, showing the cam and operating-crank ends.

In the present improvement the following parts and the general description thereof are similar to parts heretofore employed by me in potato-diggers and shown and described in the aforesaid patents—namely, the lead-wheel 2 is on a frame 3, to the forward end of which a colter 4 is secured, the object of which is to separate or divide the potato-tops and weeds of one row from those of the adjacent row. The frame $v$ of the plow $b$ has connected to it an arm 6, through the upper approximately horizontal end of which a screw 5 passes, the lower end of which screw rests upon the frame 3, so that the plow and its frame are partially supported from the frame 3 and the relation of the parts maintained.

As in my former patents, I make use of a lever 7 and cam-arm 8, pivoted to a frame 9, by the operation of which the plow is raised from and held above the ground when not in use, and I employ ratchets 10 upon the axle and pawls 11 upon the wheels $a$ $a'$, as in my former patents, the operation of which pawls when in engagement with the ratchets is to effect the movements of the various parts of the machine through suitable gears, and when said pawls are disengaged from the ratchets the digging mechanism is free and the wheels simply turn upon the axles as the digger is moved from place to place.

Among the new features of my improved digger are the series of segmental wheel-flanges 12, each of which is alike and curved to conform to the periphery of the wheel $a'$. Each flange is made with a bent end 13 and with a flat portion 14 at right angles to the bent end 13. The portions 14 are secured to the wheel $a'$ by yokes 15, whose threaded ends pass through holes in the flat portion and are secured by the nuts on the threaded ends, and the segmental wheel-flanges are connected to one another by the bolts 16, which pass through the ends of each flange and through the flange back of the bent end 13, the said flanges being almost in line and directly over the center of the wheel, the wheel $a'$ being made sufficiently smaller than the wheel $a$ upon the opposite side of the machine so that the wheel $a'$, together with the segmental flanges, is of a diameter approximating the diameter of the wheel $a$. In the operation of the machine these segmental flanges cut into the surface of the ground and act as a rib to prevent the lateral motion of the machine, and the bent ends 13 also cut into the ground at the same time with the flanges 12 and act as paddles to prevent the wheels slipping to make positive the movements of the digger mechanism.

The wheel $a$ and its pawl 11 are loose upon the main axle $c$, and they are movable longitudinally upon said axle to vary the distance between the wheels $a$ $a'$ and adjust them to the width of the rows of potatoes, and I employ collars $u$ $u'$ upon the axle, one at each side of the wheel-hub. These are made with set-screws to clamp them to the axle. The collar $u'$ carries one ratchet 10.

The main axle $c$ is provided with a sleeve $d$, and a plate $d'$ is made integral with the sleeve $d$, and the pole $e$ is connected to a pole-frame $e'$, and straps $e^2$ secure the pole-frame to the sleeve $d$, and the main frame $f$, supporting the pulverizing and horizontal finger wheel and the gears, is connected to and depends from the plate $d'$ of the sleeve.

The straps $e^2$, surrounding the sleeve $d$, are movable longitudinally thereon, (see Fig. 1,) and by this means the pole $e$, frame $e'$, and straps $e^2$ are adjustable in their relation to the sleeve $d$ and plate $d'$ to bring the plow properly in line with the hills, and their relation is fixed by the plate 37, fastened to one strap $e^2$, and the bolt 36, which passes through a hole of the row made in the plate $d'$.

The plow $b$ is of a concave form approximating a parabola, with a draw cutting edge extending rearward, as will be seen especially from Figs. 3, 5, and 8, the object of this form being to cut under the hill of potatoes with as little effort and strain as possible and at the same time to lift the earth, potatoes, and vines up into the machine for their separation. The plow is supported by an arm $q$, extending out from the frame $v$. At the rear or delivery edge of the plow I place a grating $g$, formed of parallel adjacent curved bars or fingers, the curvature thereof conforming generally to the delivery edge of the plow, and adjacent to this grating and in an approximately vertical plane I place the pulverizing-wheel $h$, (shown specially in Figs. 5, 8, and 9,) and which comprises a central hub 17 and bent angular fingers 18, the parts of which are nearly at right angles to one another. The fingers have a swinging motion, changing their position to discharge vines and weeds by action of a cam-surface. The central hub 17 is made with radially-placed bearings, through which pass the bent angular fingers 18, and in which said fingers turn. The hub 17 is mounted upon one end of a shaft 30 in the bearing 19, while on the other end of the shaft 30 is a bevel-wheel 20, operatively engaging the bevel-wheel 27.

At the forward end of the bearing 19 I place a cam 33, and the inner ends of the fingers 18 are made with crank ends 31, carrying rollers 32, which bear and run upon the face of the cam 33. These rollers 32 run into the recess upon the face of the cam, because of the downward tendency of the fingers resulting from their weight and the strain thereon, and permit the fingers 18 to swing and change their direction of travel at the moment of delivering the tops and weeds or flinging them to one side and rearward toward the horizontal finger-wheel. The rotation of this pulverizing-wheel is in the direction of the arrow, and the action is to break up the lumps of soil as they come over the rear edge of the plow onto the grating and to impart a movement to the earth and potatoes toward the rear right hand or in the direction of the horizontal finger-wheel or spreader.

The horizontal finger-wheel $i$ comprises a hub-plate 21 and the curved fingers 22, and, as will be seen from Figs. 1, 5, and 7, these fingers are preferably set slightly dishing or upwardly curved at their outer ends, and the wheel is set at an angle upward toward the right side on the machine. A bevel-wheel 42 is secured to the short shaft of the hub 21, and the said bevel-wheel and hub are connected to and supported by the system of framing. A shaft in a bearing 23 carries at one end a bevel-wheel 24 and at the other end a spur-wheel 25. A sleeve 26 is mounted upon a shaft in bearings which, with the bearings 23, are in the same system of framing. The sleeve 26 is made with teeth 43 on one end and with a bevel-wheel 27 and an adjacent spur-wheel on the other end. The bevel-wheel 27 meshes with the bevel-wheel 20, the bevel-wheel 24 with the bevel-wheel 42 on the hub of the horizontal finger-wheel, and the spur-wheel 25 meshes with the spur-wheel 28, and a toothed wheel 29, cast with one of the ratchet-wheels 10 and secured to the axle $c$ of the machine, engages the teeth 43 in the outer end of the sleeve 26, so as to turn the same and the various bevel and spur wheels to operate the pulverizing-wheel $h$ and the horizontal finger-wheel $i$ when the pawls and ratchets are in engagement.

Secured to and depending from the pole $e$ is a bar 39 and pin 40, supported thereby, and the draft-bars $s\ s'$ are connected to the clevis 44 by cross-bars 47, a pin 43, and a link 41, through which link the pin 40 passes. This bar 39 and pin 40 keep the line of draft in line with the pole and at the same time allow for a slight adjustment vertically to accommodate the various heights of the pole. The draft-bars $s\ s'$, as in my aforesaid patents, are of different lengths and are attached at different distances from the pole, so as to equalize or balance the resistance on the two wheels, together with the downward pull of the plow.

I employ a fender $t$, secured to and rising above the portion of the frame to which the plow $b$ is connected. This fender is curved slightly as it rises and is adjacent to the pulverizing-wheel $h$, and the object of this fender is to prevent the tops of the potatoes falling over onto the plow-supporting frame and to assist the functions of the pulverizing-wheel in advancing the tops to one side of the machine. I prefer to make this fender $t$ in the form shown in Figs. 3, 5, and 8, wherein the same is supported by and connected to the frame carrying the plow, with the bars forming the grating connected to and supported by the fender.

In the operation of the machine further than hereinbefore described the height of the plow $b$ is to be controlled by the screw 5 and the arm 6 in relation to the lead-wheel 2. The plow $b$ cuts under the row of potatoes, lifting the soil, potatoes, and tops, which pass off the rear edge of the plow onto the grating $g$ and in contact with the rapidly-revolving pulverizing-wheel $h$, which by its centrifugal action and gravitation of the material discharges the earth in a pulverized condition, together with the potatoes, upon the horizontal finger-wheel. The pulverizing-wheel operating low down and directly over the grating serves to break up the earth, which is delivered, with the potatoes, through gravitation, aided by centrifugal force, between the fingers upon the separating finger-wheel or spreader at the rear and at a point where the curved fingers which form the grating terminate. The pulverizing-wheel preferably contains but five fingers, affording wide spaces facilitating gravitation and centrifugal action, thereby discharging the earth and potatoes. However, I do not limit myself to the above number. By the gravitating and centrifugal delivery of earth and potatoes the vines and weeds are detained, which through the cam action of the fingers turns them backwardly, delivering all trash to one side of the machine separately from the potatoes, which in the discharge are separated from the vines, except in the instance of green tops or early digging, when they are turned root end upward, exposing the tubers.

I claim as my invention—

1. In a potato-digger, the combination with the frame, of a concave plow having a long rearward-extending draw cutting edge, a grating formed by curved fingers adjacent and parallel to the delivery edge of the plow and a pulverizing-wheel with movable fingers and set obliquely to the axle of the machine and approximately parallel to the rear edge of the plow and means acting in connection with the pulverizing-wheel for delivering the potatoes and vines separately to one side of the machine, substantially as set forth.

2. The combination in a potato-digger, with the plow and the frame supporting the same, and a grating adjacent to the delivery edge of the plow, of a fender connected to and supported by the same frame and rising above the said frame and bent toward the plow and a pulverizing-wheel adjacent to the said fender and grating, substantially as set forth.

3. In a potato-digger, the combination with a plow and a grating of curved bars adjacent thereto, of a pulverizing-wheel set approximately parallel to the grating and above the same and comprising a revoluble hub and bent angular fingers connected to the said hub, and means for moving the fingers with the rotation of the pulverizing-wheel, substantially as set forth.

4. In a potato-digger, the combination with a plow and a grating adjacent thereto and formed of curved bars, of a pulverizing-wheel set approximately parallel to the said grating and above the same, and comprising a central revoluble hub, bent angular fingers passing through said hub and adapted to turn therein, a cam adjacent to the back of the said hub and rollers connected to the inner ends of the said fingers running upon the surface of the cam and thereby swinging the said fingers, substantially as set forth.

5. In a potato-digger, the combination with a plow, a grating adjacent thereto and formed of curved bars or fingers, and a pulverizing-wheel set approximately parallel to the grating and above the same, and comprising a central revoluble hub, a shaft therefor and means for turning the same, bearings formed radially with the said hub, bent angular fingers passing through the said bearings, crank ends connected to the inner portions of the said fingers and rollers carried by the said crank ends, a cam adjacent to the said hub and upon which the said rollers bear, the said rollers running upon the surface of said cam with the rotary movement of the pulverizing-wheel and swinging the fingers, the parts being so placed that a swinging movement is imparted to the fingers simultaneously with the throwing off of the tops thereby, substantially as set forth.

6. In a potato-digger, the combination with a plow and a grating of curved bars adjacent thereto, of a pulverizing-wheel set approximately parallel to the grating and above the same and comprising a revoluble hub, bent angular fingers connected to the hub, and means for swinging the fingers with the rotation of the pulverizing-wheel, and a horizontal finger-wheel rearward of the said pulverizing-wheel, substantially as set forth.

7. In a potato-digger, the combination with a plow and a grating adjacent thereto and formed of curved bars, of a pulverizing-wheel set approximately parallel to the said grating and above the same and comprising a central revoluble hub, bent angular fingers passing through the said hub and adapted to turn therein, a cam adjacent to the back of the said hub and rollers connected to the inner ends of the said fingers running upon the surface of the cam and thereby swinging the said fingers and a horizontal finger-wheel rearward of the said pulverizing-wheel, substantially as set forth.

8. In a potato-digger, the combination with the frame, of a concave plow having a long rearward-extending draw cutting edge, a grating of curved bars adjacent and parallel to the delivery edge of the plow, a pulverizing-wheel set obliquely to the axis of the machine above the fingers and approximately parallel to the rear edge of the plow and having swinging fingers and a finger-wheel rearward of the pulverizing-wheel, substantially as set forth.

Signed by me this 23d day of March, 1900.

L. AUGS. ASPINWALL.

Witnesses:
C. G. ROWLEY,
W. C. SHANAFELT.